June 1, 1965    F. C. MELDOLA    3,186,258
LIMITED SLIP DIFFERENTIAL
Filed May 18, 1961    3 Sheets-Sheet 1
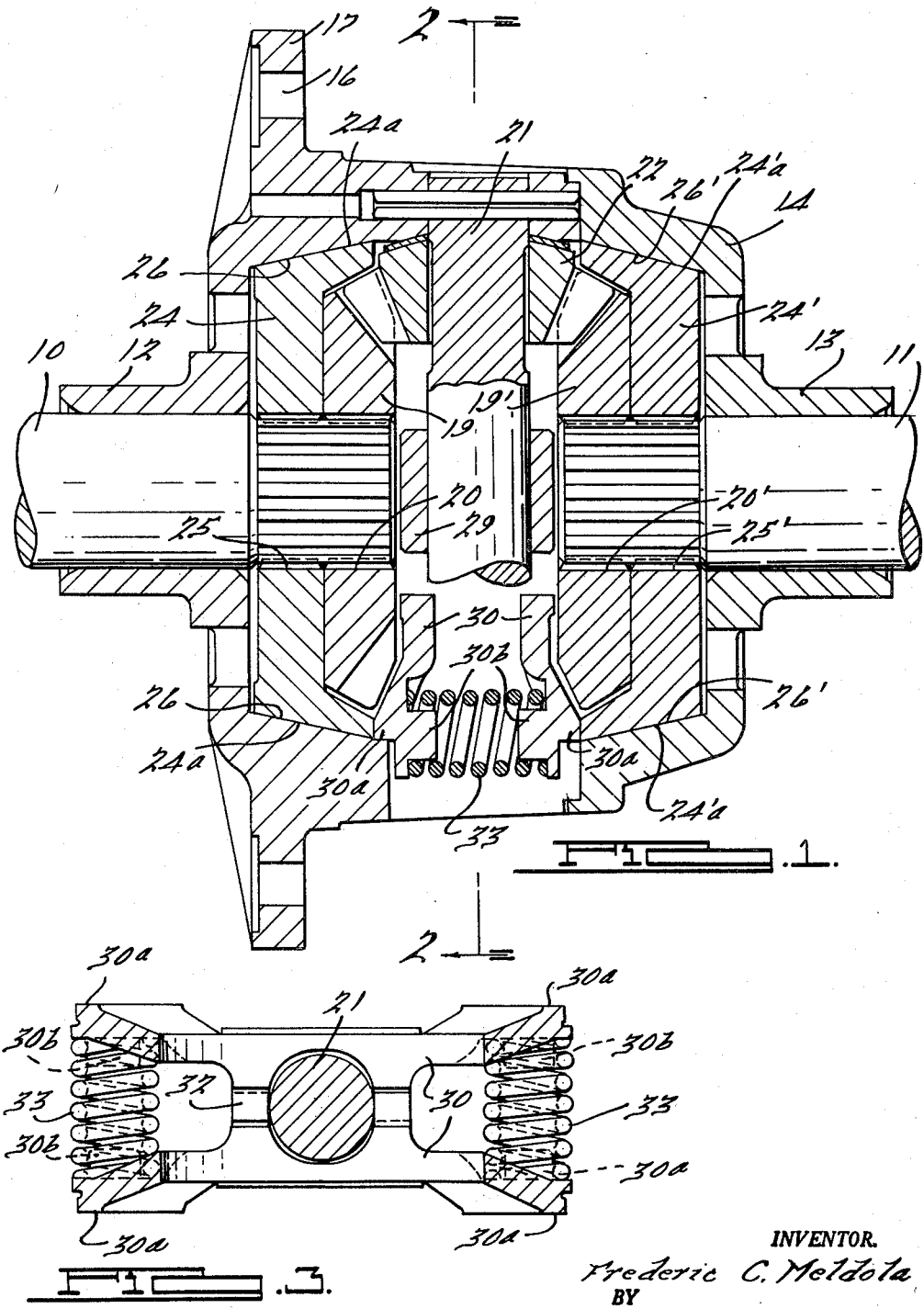
INVENTOR.
Frederic C. Meldola
BY
Harness and Harris
ATTORNEYS

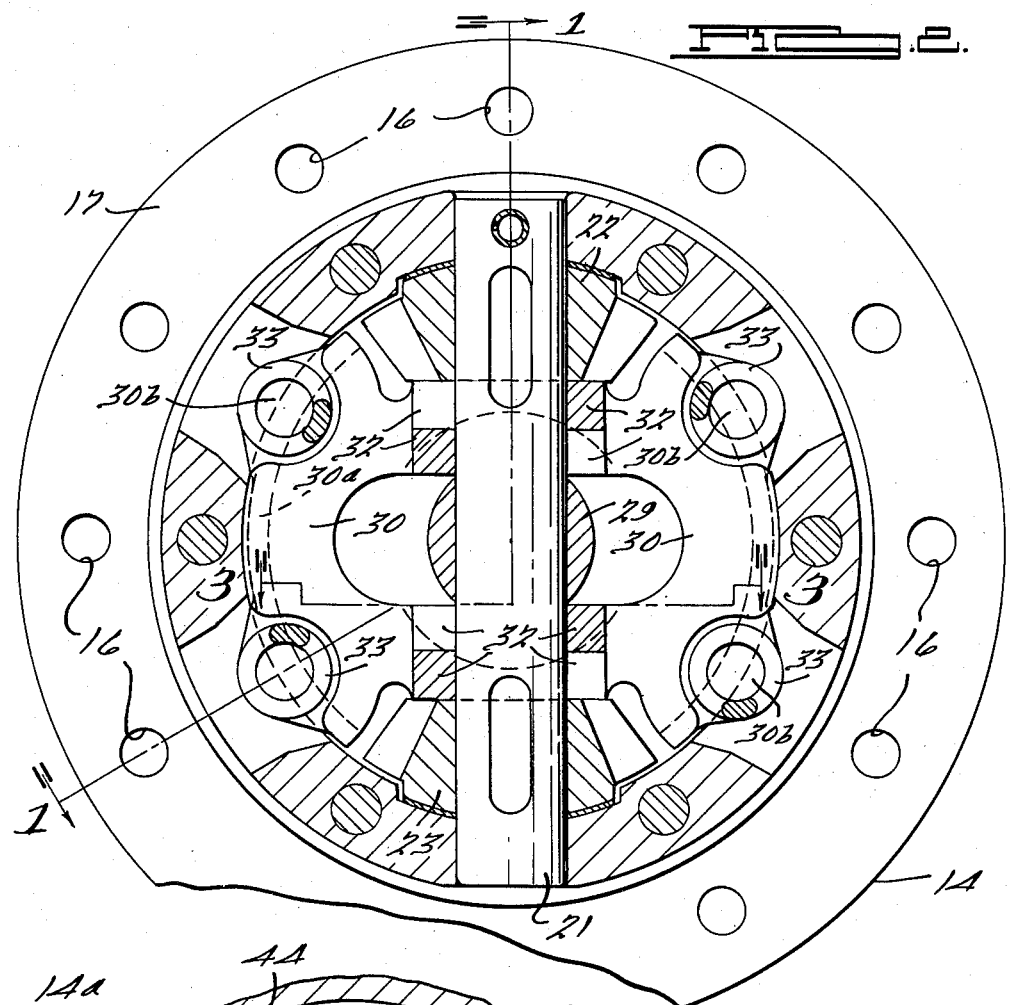
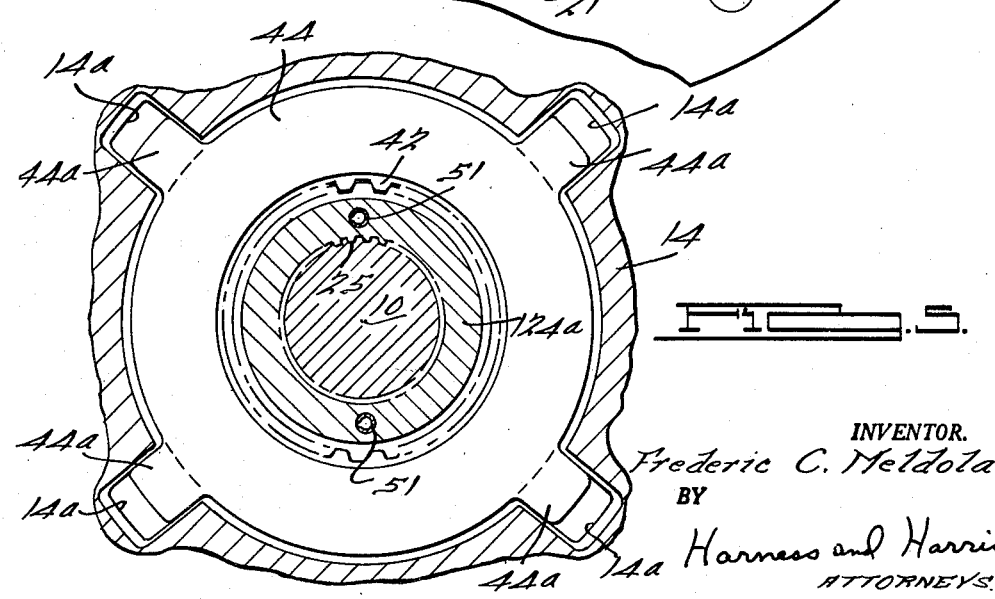

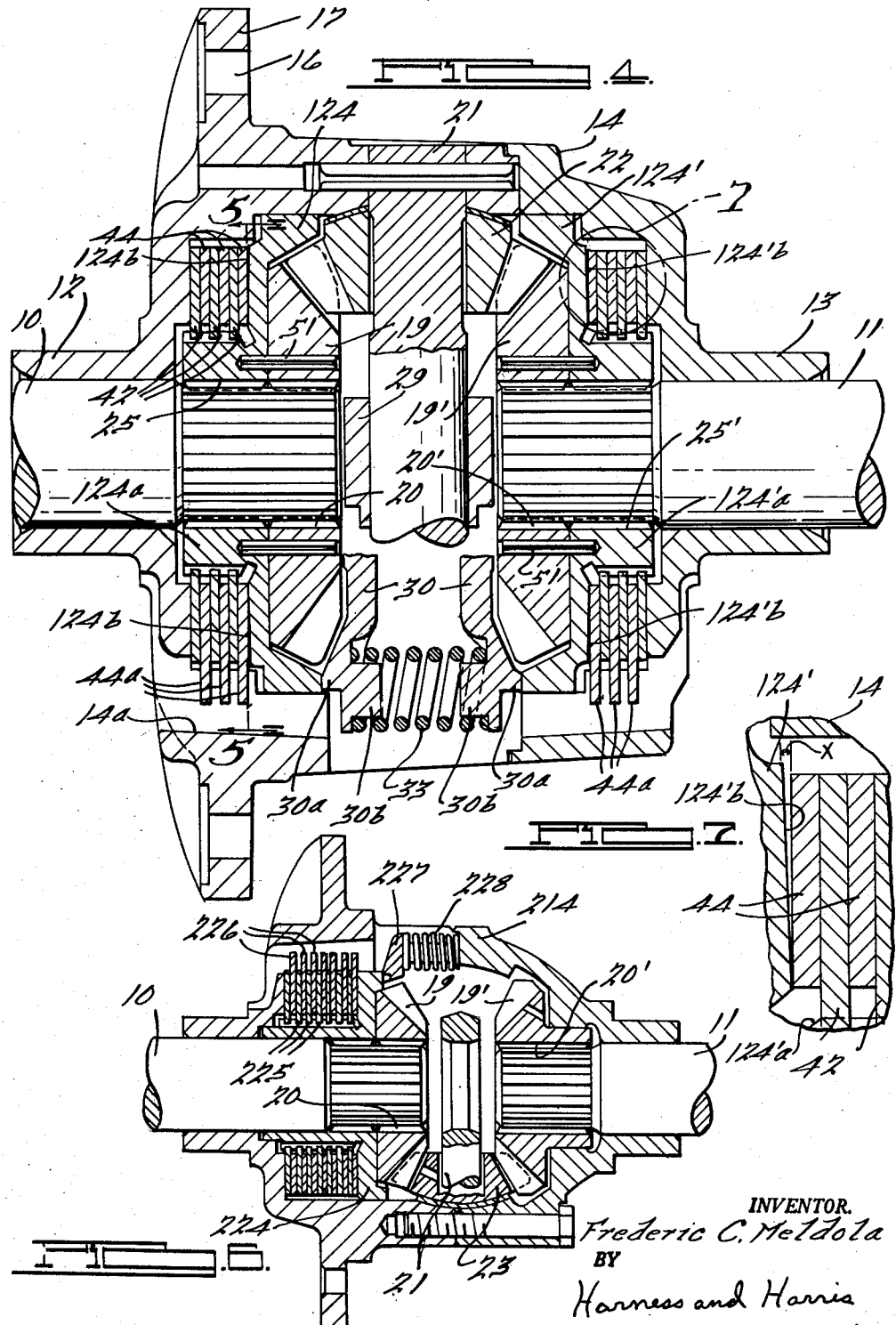

3,186,258
LIMITED SLIP DIFFERENTIAL
Frederic C. Meldola, De Witt, N.Y., assignor to Chrysler Corporation, Highland Park, Mich., a corporation of Delaware
Filed May 18, 1961, Ser. No. 110,979
3 Claims. (Cl. 74—710.5)

This invention relates to improvements in differential mechanisms of the bevel gear type such as are used in split-drive motor vehicles and other power dividing applications which mechanisms are sometimes designated as limited slip differentials or semi-locking differentials.

As is well known to motorists and to others skilled in the art, when one of the driving wheels of a motor vehicle loses traction and begins to spin, the other driving wheel remains stationary, if it has traction, and does not operate to move the vehicle. Because of this condition, a motor vehicle is completely immobilized if one of the driving wheels loses traction, as so frequently occurs when driving on wet, slippery or muddy surfaces.

To provide the best possible performance there should be at least a minimum amount of resistance torque available in the differential when one wheel is subject to very low resistance so that wheel slippage can be eliminated on low traction surfaces. In addition to this, it is desirable to provide a braking or resistance torque in the differential which is variable in proportion to the amount of differential input torque being transmitted to the axles.

Many prior art constructions have been provided in an attempt to satisfactorily incorporate the above features. Generally, these prior constructions have utilized the axial thrust of the differential side gears to load a friction clutch or braking means. Resilient means in the form of coil springs has been provided between the side gears to bias the side gears outwardly to provide a minimum load on the friction clutch or braking means. However, this minimum bias has adversely affected the normal operation and backlash of the side gears. Furthermore, the mounting of the coil springs between the side gears has subjected the springs to forces which have caused excessive failures due to buckling.

Prior constructions, such as Wildhaber Patent No. 1,750,981, have also utilized a minimum bias on a differential to retard differentiation, the bias being independent of the side gears; however, such constructions have not provided means for increasing the retarding effect.

Therefore, an object of this invention it to provide a minimum retarding action independent of the side gears which retarding action is increased by axial thrust of the side gears upon increase of input torque.

Another object of this invention is to utilize an independent spring thrust and the axial thrust of the differential side gears to provide a simple and self-adjusting means on the differential action to control slippage at varying load conditions, at the same time allowing differentiation for turning.

A still further object of this invention is to provide a differential which is of simple construction, being composed of a minimum of parts, which are not only easy to fabricate and install but also very economical to manufacture.

It is a further object of the invention to provide simple and inexpensive means in a conventional type of differential so that a differential equipped with my device may be readily substituted for the existing differential in a motor vehicle or the like.

It is a further object of my invention to utilize combined spring thrust and axial thrust of the bevel side gears to provide simple and self-adjusting means for actuating simple braking surfaces to restrict the slippage of this type of mechanism under varying load conditions, at the same time allowing differentiation for relative rotation.

It is a further object of my invention to pre-load or bias the differential mechanism so that uncontrolled differential action can only occur after a predetermined minimum amount of torque difference between the two driven axles has been reached, and that this minimum torque difference be increased with the increase of torque transmitted by the differential.

It is well known in the differential art that the purpose of such devices is to divide torque equally between two shafts and that if one shaft (or wheel) is unable to absorb torque, no torque can be supplied to the other shaft (or wheel). It is the purpose of my device, as hereinafter described, to preload or bias the differential mechanism so that the torque absorption by either output shaft cannot fall below a predetermined amount. This preloading or biasing provides internal torsional resistance or braking to differentiation, thereby insuring a minimum of torque being delivered to either shaft.

Certain basic characteristics of a differential must exist in order to provide the best possible performance and to do the most for the mobility of the car under adverse conditions as well as for the roadability under all conditions. First, the braking or resistance torque in the differential must be variable proportionately to the amount of ring gear torque being transmitted through the axle to provide in effect an automatic adjustment of the amount of the braking torque. Second, there should be a minimum amount of resistance torque available when one wheel is subject to very low resistance so that wheel slippage can be eliminated on low traction surfaces. Third, the resistance or braking torque should have a minimum value under conditions such as coasting, where there is no ring gear torque.

The present invention includes a combination of a biasing load in the form of springs which provide a minimum resistance or braking torque at a no-load condition and a variable load which is provided by gear tooth force in the differential. These forces, coupled with the mechanical advantage of a cone friction ring, function to provide the necessary amount of resistance torque proportional to the ring gear in-put torque and additive to the amount supplied by the springs.

Most important of all, when conditions are such that one axle shaft can absorb no torque, the initial degree of braking torque in the differential because of the springs provides a resistance which enables gear thrust to occur, which in turn further loads the cones to provide a sufficient amount of resistance to differentiation.

In the disclosed embodiments of this invention, a power transmission gear train is operatively disposed within a gear case. Resilient means independent of the gear train and the gear case biases a clutch means to oppose relative rotative movement of members of the gear train. The gears of the gear train are meshed in a relationship to provide a component of tooth pressure for urging gears of the gear train axially outward to increase the loading of the clutch means in proportion to the input torque of the transmission.

These and other objects and advantages of this invention will become apparent from the following detailed description when taken in connection with the accompanying drawings wherein:

FIG. 1 is a sectional view of a differential showing one of the embodiments of my invention, the view being taken on the line 1—1 of FIG. 2;

FIG. 2 is a cross section taken on the line 2—2 of FIG. 1;

FIG. 3 is a fragmentary sectional view taken on the line 3—3 of FIG. 2;

FIG. 4 is a sectional view similar to FIG. 1 of a modified form of this invention;

FIG. 5 is a sectional elevational view taken along the line 5—5 of FIG. 4;

FIG. 6 is a sectional plan showing another modified form of my invention; and

FIG. 7 is an enlarged, fragmentary, sectional, elevational view of a portion of the FIG. 4 assembly included with circle 7.

Referring to the drawings, the numerals 10 and 11 indicate the output axle shafts of a motor vehicle differential drive. These shafts at their adjacent or inner ends project in rotatable relation into opposed axially aligned hubs 12 and 13 of a rotary differential case 14. A conventional ring gear (not shown) is attached to case 14 by means of bolts, that are secured through apertures 16, to flange 17 of the case 14. The ring gear transmits power drive from the propeller shaft (not shown). As is very well known, the case 14 is enclosed in the conventional manner within a differential housing (not shown), which housing carries the usual supply of lubricant for the differential.

Interiorly of the case 14 the adjacent end portions of the aforesaid axle shafts 10 and 11 are fitted with differential or side gears 19–19' spline connected at 20–20' to said shafts, the said gears being disposed in axially aligned spaced and facing relationship and being axially shiftable on their respective axle shafts.

Extending diametrically through the case 14 and centrally between the gears 19–19' is a spider member 21. The said member carries bevel pinions 22 and 23 mounted thereon in spaced relationship to each other for meshing engagement with the side gears 19–19'.

The foregoing description of the elements 10 to 23, inclusive, is a description of the conventional differential construction and is employed merely for the purpose of aiding in a better understanding of the embodiment of my improved device.

In the embodiment of my invention, as shown in FIGS. 1–3, I drivingly secure to the axles 10, 11, on the outer respective faces of each of the conventional side gears 19–19', annular conical rings or clutching elements 24–24'. The latter are held in positions on the aforesaid axles by means of splines 25–25'. The splined connections 25–25' permit axial movement of the clutching rings 24–24' on the axles 10, 11. Conical seats 26–26' are machined in the interior walls of the case 14. The aforesaid conical recesses or seats 26–26' are disposed in axially aligned spaced and facing relationship to each other, and each of said seats is, therefore, also disposed in axially aligned facing relationship to the conical rings 24, 24' for seating engagement of the latter therein.

Mounted on the spider 21 is a spacer block 29 that resists inward movement of side gears 19, 19' to prevent bottoming of side gear teeth in the pinion gearing. Also seated around the spider 21 are a pair of spring seating shoes 30 that have overlapping finger portions 32 (see FIGS. 2 and 3). These shoes 30, 30 are spaced from the side gears 19, 19' so that the compressed springs 33, extending between the shoes, exert a shoe expanding force that is independent of the gear separating force developed between side gears 19, 19' and pinion gears 22, 23 during the transmission of torque by the differential gearing. The shoes 30, 30 actually serve as clutch pressure plates because the shoes each have finger portions 30a that bear against the clutch rings 24, 24' such that the expansion forces exerted by the compressed springs 33 will continuously urge the coned portions 24a, 24a' of the clutch rings 24, 24' into clutching engagement with the portions 26, 26' of the differential case 14. The pressure plates 30, 30 each include four inwardly extending posts 30b that seat the compressed springs 33. From FIG. 1 it is clear that the expansion springs 33 are between but radially outwardly of the side gears 19, 19' so that the springs exert a clutch engaging force that is completely independent of the gear separating force resulting from transmission of the torque through the gearing of the differential unit.

With the differential construction disclosed and described it is obvious that means has been provided in the unit that develops an initial bias or preload in the differential gearing, independent of the gear separating forces resulting from differential torque transmission, which preload resists the differential action of the unit. Upon any increase in differential transmitted torque the gear tooth designs of the side and pinion gears are such that the side gears 19, 19' are urged axially apart to further resist differential action in more or less direct proportion to the torque load being transmitted by the differential unit.

FIGS. 4 and 5 show a modified form of this invention wherein plate-type clutching means 42, 44 is used in place of the cone clutching means 24a, 26 and 24'a, 26' of FIGS. 1–3. In all other respects the structure shown in FIGS. 4 and 5 is substantially identical to the FIGS. 1–3 form of the invention. Where parts are identical to those shown in the FIGS. 1–3 form the same reference numerals have been used in FIGS. 4 and 5. From FIGS. 4 and 5 it will be noted that the pressure plate members 124, 124' are spline connected to the axle shafts 10, 11 as indicated at 25, 25'. These pressure plate members 124, 124' are axially shiftable in the splineways of the axle shafts as are the associated side gears 19, 19'. Connector pins 51 may interconnect the adjacent side gears and pressure plates to prevent relative rotation therebetween. The friction clutch plates 42 are spline connected to the hub portions 124a and 124'a of the pressure plates 124, 124' whereas the pressure plates 44 (see FIG. 5) are connected by ears 44a to the channel grooves 14a of the casing 14. The precompressed springs 33 that extend between the shoes 30 are seated on studs 30b of the shoes and urge the shoe finger portions 30a, that are engaged with the clutch pressure plates 124, 124' apart, so that the springs bias the friction plates 42, 44 into clutching engagement with the clutch surfaces of the case 14 to oppose relative movement of the members of the gear train independently of any gear separating forces that may act during torque transmission through the differential gearing. The FIGS. 4 and 5 forms of this invention function in the same manner as the FIGS. 1–3 forms to limit the slip in the differential and thereby provide means for effecting a drive to one of the axles even though the other axle may not be sufficiently retarded by loading to prevent it from running free.

FIG. 7, which is an enlarged, fragmentary view of the clutch pressure plate 124' shows that there is a slight tapered relief $x$ on the pressure plate surface 124'b. This is to provide for a uniform pressure times velocity engaging force throughout the clutch friction surfaces. Without this taper relief $x$ it was not unusual for scoring to originate near the periphery of the plate face 124b where the clutch plate rubbing velocity is the greatest. With the introduction of the pressure plate tapered relief $x$ such scoring has been eliminated. With this relief $x$ the pressure plate engaging pressure varies inversely with the radius so this tapered clutch plate relief $x$ produces a condition of substantially uniform plate engaging pressure such that all portions of each friction surface are subjected to the same heating intensity.

FIG. 6 is another modification of this invention wherein only one set of friction disc clutching elements 225, 226 are used rather than the two, symmetrically arranged sets of friction discs 42, 44 shown in the FIGS. 4 and 5 form of this invention. The FIG. 6 design may be less costly than the FIG. 4 design because of elimination of about one-half of the clutching parts. The FIG. 6 design may also be more readily inserted in certain differential casings than the FIG. 4 design. Both designs function in the same manner to insure positive drive transmission to at least one axle at all times even when the other axle may be free of any load. In the FIG. 6 form the side gears 19, 19' are connected to the axles 10, 11 by splines 20, 20' that will permit some relative axial movement. The spider 21 mounts the pinion gearing 23 in conventional manner. A single pressure plate 224 is used in this design and it is splined to axle 10 for relative axial movement. The hub of pressure plate 224 has drivingly fixed thereto by toothed connections a series of friction disc clutch plates 225. Clutch plates 225 are arranged to be frictionally engaged with the friction disc plates 226 that are drivingly keyed to the differential housing 214. The pressure plate 224 is arranged so as to have portions thereof in engagement with the shoe member 227. Shoe 227 is continuously urged into engagement with the pressure plate 224 by a set of precompressed springs 228 that extend between the shoe 227 and the casing 214. Springs 228 thus provide a continuous clutch engaging force to resist differentiation at all times. This spring generated clutch engaging force is independent of the gear separating force developed between the side and pinion gears during differential torque transmission. The gear separating force supplements the spring generated clutch engaging force to oppose differential drive slip.

In the several differential designs herein disclosed the intermeshed side gears and pinion gears have positive pressure angled teeth whereby during the transmission of torque through the gearing a component of tooth pressure is developed in an axially extending direction with respect to the side gears such that the axially shiftable side gears are biased outwardly to supplement and increase the loading on the friction surfaces of the associated clutching elements and thereby resist differential action by an amount proportional to the input torque to the transmission. The pitch lines of said side and pinion or compensating gears are disposed at an angle so as to utilize the axial thrust of the meshing gear teeth to supplement the thrust of the spring means 33 or 228 and thereby increase the force applied to the clutching means in proportion to the torque input to the differential.

I claim:

1. In a differential transmission unit, the combination comprising a rotatable gear case, a power transmission gear train operatively positioned within said gear case and including a compensating gear and a pair of side gears intermeshing therewith, clutch means operatively disposed between each of said side gears and said gear case for opposing relative rotational movement of said side gears with respect to said gear case, each of said clutch means comprising an annular-like friction member respectively operatively connected to said side gears for rotational movement therewith, a first friction surface of generally conical configuration formed on each of said friction members adapted to respectively frictionally engage second spaced friction surfaces of generally conical configuration carried by said gear case internally thereof, spaced annular-like pressure plates continually engaging portions of said friction members, a plurality of spring members urging said pressure plates in directions causing said first friction surfaces to engage said second friction surfaces, the compensating gear and side gears being meshed in a relationship to provide a component of tooth pressure for urging said side gears axially against said respective friction members in order to increase the force applied to said friction members in proportion to input torque to the transmission.

2. In a drive transmission comprising driving and driven, relatively rotatable, coaxial members, a clutch mechanism adapted to drivingly connect said members comprising a first radially extending friction plate operatively connected to one of said members for rotation therewith, a second radially extending friction plate drivingly connected to the other of said members and arranged adjacent to said first friction plate, a pressure plate having a radially extending annular friction surface which is adjacent to one of said friction plates and engageable with a radially extending annular friction face formed on said one of said friction plates, said friction surface and said friction face being rotatable with respect to each other and at times urged against each other so as to define an area of frictional contact therebetween, means responsive to the torque input of said transmission for driving said friction surface and friction face towards each other with a force in accordance with the magnitude of said torque input so as to create a sliding frictional force over the entire area of said area of frictional contact, and additional means continually resiliently biasing said friction surface and friction face towards each other so as to apply a substantially constant force thereagainst in order to independently produce a second sliding frictional force against said entire area of said area of frictional contact, said additional means comprising a plurality of compression springs biasing said pressure plate into engagement with said one of said friction plates, said means responsive to the torque input of said transmission and said compression springs applying in parallel relationship to each other forces against said pressure plate in order to develop a cumulative sliding frictional force applied by said pressure plate against said entire area of said area of frictional contact.

3. In a differential transmission unit, the combination comprising a rotatable gear case, a power transmission gear train operatively positioned within said gear case and including a compensating gear and a pair of side gears intermeshing therewith, clutch means operatively disposed between at least one of said side gears and said gear case for opposing relative rotational movement of said one side gear with respect to said gear case, said clutch means comprising an annular-like friction member operatively connected to said one side gear for rotational movement therewith, a first friction surface of generally conical configuration formed on said friction member and adapted to frictionally engage a second spaced friction surface carried by said gear case internally thereof, an annular-like pressure plate fixed for rotation with said case in continuous contact with said friction member, at least one spring member urging said pressure plate in a direction causing said first friction surface to engage said second friction surface, the compensating gear and said one side gear being meshed in a relationship to provide a component of tooth pressure for urging said one side gear axially directly against said friction member in order to increase the force applied to said friction member in proportion to input torque to the transmission.

References Cited by the Examiner
UNITED STATES PATENTS

| 1,317,811 | 10/19 | Neilsen | 192—55 |
| 2,679,769 | 6/54 | Parrett | 74—710.5 |
| 2,966,076 | 12/60 | O'Brien | 74—710.5 |
| 3,053,114 | 9/62 | Singer | 74—711 |

FOREIGN PATENTS

| 65,980 | 12/47 | Denmark. |
| 725,571 | 3/55 | Great Britain. |

DON A. WAITE, *Primary Examiner.*

BROUGHTON G. DURHAM, *Examiner.*

Notice of Adverse Decision in Interference

In Interference No. 95,267 involving Patent No. 3,186,258, F. C. Meldola, LIMITED SLIP DIFFERENTIAL, final judgment adverse to the patentee was rendered May 28, 1968, as to claim 2.

[*Official Gazette December 17, 1968.*]